though a precision column.

2,839,421

AN ALKOXY ALUMINUM CHELATE, A DISPERSION OF IT IN AN ORGANIC LIQUID AND A WATER REPELLANT POROUS OBJECT

Charles J. Albisetti, McDaniel Heights, Del., assignor to E. I. du Pont de Nemours & Company, Wilmington, Del., a corporation of Delaware No Drawing. Application April 6, 1955
Serial No. 499,769

8 Claims. (Cl. 106—287)

This invention relates particularly to chelates.

An object is the preparation of aluminum chelates therefrom. Another object is the preparation of compositions of them for rendering porous objects water repellent. Other objects will appear hereinafter.

These objects are accomplished by the present invention of new aluminum chelate compositions corresponding to the average formula $Al(R)_x(OR')_y$, in which R' is alkyl, R is the anion from a bidentate chelating agent containing an alkyl chain of at least 12 carbon atoms and one acidic hydrogen, and $x$ and $y$ are not less than 0.5 but total 3.

The chelates of this invention are made by mixing, in the presence of an organic solvent, a bidentate chelating agent containing an alkyl group of at least 12 carbon atoms and one acid hydrogen and an aluminum trialkoxide of a volatile alkanol and stirring and heating the mixture until at least one molar proportion of the volatile alkanol has been removed per mole of ligand.

The chelates of this invention are formed by a cyclization reaction involving the aluminum. In the cyclization reaction the acidic hydrogen in the ligand (bidentate chelating agent) reacts with one alkoxy group in the aluminum trialkoxide forming an alcohol, and the reaction proceeds with chelate formation.

The following examples in which parts are by weight are illustrative of the invention.

EXAMPLE I

Octadecyl acetoacetate, M. P. 39–39.8° C., was prepared by ester exchange between 697 g. octadecyl alcohol and 368 g. of ethyl acetoacetate in 450 g. refluxing toluene. After removal of the toluene/ethanol binary, the product was separated from toluene and excess ethyl acetoacetate by holding at 100° C. under 1 mm. pressure and was crystallized from petroleum ether or heptane.

(Octadecyl acetoacetato) aluminum diisopropoxide was prepared by refluxing 18 g. of above and 10 g. of aluminum isopropoxide (1:1 molar ratio) in 100 g. of benzene. The benzene/isopropanol binary was removed through a precision still. The residue, after removal of solvent, was an oil.

Analysis.—Calculated for $C_{28}H_{55}O_5Al$: C, 67.40%; H, 11.04%; Al, 5.42%. Found: C, 67.75%, 67.00%; H, 11.17%, 11.08; Al, 5.50%, 5.53.

A 71% toluene solution had a viscosity of 0.1 poise at 25° C.

The compound has the following structural formula

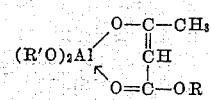

where R is an octadecyl group and R' is an isopropyl group.

EXAMPLE II

An $N-C_{16-18}$ alkyl salicylaldimine, M. P. 37–38° C., was prepared from salicylaldehyde and "Armeen HTD," a commercial mixture of $C_{16}$ and $C_{18}$ fatty amines. The aldimine had a molecular weight corresponding to 359.

A long chain $N-C_{16-18}$ alkyl salicylaldimine aluminum diisopropoxide was obtained by adding 34 g. of the aldimine to 20.4 g. of aluminum isopropoxide in 100 cc. of benzene. Eighteen grams of a benzene/isopropyl alcohol binary was removed by distillation through a precision column. Excess benzene was removed and the product, a red oil, was separated by trituration with acetonitrile.

Analysis.—Calculated for $C_{30}H_{54}O_3NAl$: C, 71.50%; H, 10.75%. Found: C, 70.91%; H, 10.56%.

EXAMPLE III (Distearin acetoacetato) aluminum diisopropoxide was obtained by refluxing a solution of 35 g. (0.05 mole) of distearin acetoacetate, 10.2 g. of aluminum isopropoxide (0.05 mole) and 100 ml. of toluene under a precision still. There was obtained 6 ml. of a toluene/isopropyl alcohol binary, B. P. 81–82° C. Excess toluene was removed under a reduced pressure of 1 mm. The residual yellow wax was soluble in benzene but insoluble in acetone. The wax became fluid at 45° C.

Analysis.—Calculated for $C_{49}H_{93}O_9Al$: C, 68.4%; H, 10.8%. Found: C, 68.9%; H, 10.9%.

EXAMPLE IV (Octadecyl benzoylacetato) aluminum diisopropoxide was obtained by adding a solution of 104 g. (0.25 mole) of octadecyl benzoylacetate, M. P. 58–60° C., in 200 cc. of warm toluene dropwise to a refluxing solution of 51 g. (0.25 mole) of aluminum isopropoxide in 200 cc. of toluene. The toluene/isopropyl alcohol binary was removed through a precision still and the excess toluene was removed under vacuum. The resulting product was a fluid yellow oil.

EXAMPLE V

A composition corresponding to (octadecylbenzoylacetato)$_{0.5}$ aluminum(isopropoxide)$_{2.5}$ was prepared by refluxing a mixture of 21 g. of octadecyl benzoylacetate, 20.4 g. of aluminum isopropoxide and 150 ml. of toluene under a precision still. There was removed overhead 2.85 g. of an isopropyl alcohol/toluene binary, B. P. 79–83° C.

EXAMPLE VI

A composition comprising (octadecyl benzoylacetato)$_{2.5}$ aluminum(isopropoxide)$_{0.5}$ was prepared by refluxing a mixture of 21 g. of octadecyl benzoylacetate, 4.1 g. of aluminum isopropoxide, and 100 cc. of toluene. There was removed overhead 4.2 g. of the toluene/isopropyl alcohol (79:21) binary, B. P. 80–82° C.

EXAMPLE VII

Distearin acetoacetate was prepared by refluxing a toluene solution of 156 g. of distearin and 35 g. of ethyl acetoacetate under a precision still. Ethanol, 11 g., was removed overhead as a toluene/ethanol binary.

A composition corresponding to (distearin acetoacetato)$_{1.5}$ aluminum(isopropoxide)$_{1.5}$ was prepared by adding 35 g. of aluminum isopropoxide to the above solution and continuing the distillation to remove 15.7 g. of isopropyl alcohol formed as the toluene/alcohol binary. Removal of the toluene gave a yellow wax.

The chelate-forming structure is a bidentate group having an acidic hydrogen, at least one straight long chain, i. e., containing at least 12 carbon atoms, saturated hydrocarbon group, preferably an alkyl group, and two donor groups which are so situated with respect to each other that formation of a chelate ring of five to six atoms is possible. The preferred donor groups are those which include oxygen, nitrogen, or sulfur as the donor atom. These groups are well known in chelate chemistry, the principal ones being phenolic or alcoholic hydroxyl, —OH; carbonyl, =CO; alkoxycarbonyl, —COOR; primary amino, NH$_2$; thioalcohol, —SH; thiocarbonyl, =CS; etc. Some of these groups may form covalent bonds and others coordinate bonds with the metal which is part of the chelate ring. Common bidentate groups with one acidic and one coordinating group include

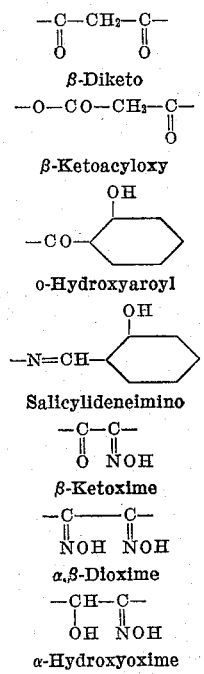

o-Aminophenol; 8-hydroxyquinoline, etc.

The invention is generic to chelates of aluminum having at least ½ mole alkoxide per aluminum atom and having as the ligand a bidentate chelating structure containing an alkyl chain of at least 12 carbon atoms, including the β-ketoacylates of long chain saturated fatty acid esters of polyhydric alcohols, e. g., the acetoacetic or benzoylacetic esters of distearin, octadecyl acetoacetate, dodecyl acetoacetate, ethyl stearoylacetate; dodecylglyoxal; salicylideneimines from long chain amines, e. g., N-dodecyl-salicylaldimine from dodecylamine and salicylaldehyde; long chain esters of salicylic acid, e. g., octadecyl salicylate; long chain diketones, e. g., stearolylacetone; long chain esters of an acetone dicarboxylic acid, e. g., dioctadecyl acetonedicarboxylate, etc.

Specific examples of aluminum trialkoxides are aluminum trimethoxide, triethoxide, triisopropoxide, and tributoxide. Especially useful are aluminum trialkoxides of short chain alkanols, i. e., alkanols containing less than four carbon atoms, because of their reactivity and ease with which the alcohol is removed from the reaction mixture.

In preparing the chelates of this invention, it is desirable to use a reaction medium which is volatile and substantially unreactive with the components of the chelate. Specific examples of such media are benzene, toluene, xylene, aliphatic petroleum fractions, dioxane, diethyl ether, etc.

The quantity and volatility of reaction medium is such as to permit removal of the volatile alcohol during the chelate-forming reaction, particularly as a binary.

The chelate-forming reaction is effected at temperatures of at least 60° C. In actual practice the specific temperature used is that required to remove the alcohol formed from the reaction medium.

In the alkoxy aluminum chelates of this invention the ratio of alkoxy groups to ligand portions varies from 0.5:2.5 to 2.5:0.5 and the total of both is 3. In making these aluminum chelates an aluminum trialkoxide of a volatile alcohol is reacted with a long chain ligand in amount which in mole proportions varies from 2:1 to 1:2.5.

The aluminum chelates of this invention are unique in providing treatments which impart water-impermeability to porous substrates. This use is illustrated below.

EXAMPLE A

An ordinary building brick was sawed into eight approximately 2-inch cubes, each having an unsawed surface which in a brick wall would normally be exposed to weather. The unsawed surface was brushed with a solution of the water-proofing agent to be tested and allowed to air-dry for several days. The treated side was sealed to one end of a hollow glass cylinder, open at both ends and 14 inches long by 1.2 inches in diameter, using a molten 1:1 beeswax-rosin mixture as the cement. The cylinder was placed upright, with the brick on the base, and filled to a depth of 12 inches with water. Periodically the level of the water in the cylinder was measured. Data obtained in this way are shown in the table below.

Table I

| Agent (applied as a solution in 5 g. of toluene) | Grams of Agent per 4 sq. in. of brick surface | Drop in inches of level in cyl. | |
|---|---|---|---|
| | | 1 hr. | 24 hrs. |
| None | | 1.4 | 11.0 |
| A commercial silicone | 0.01 | 0.0 | 0.1 |
| Paraffin wax | 0.10 | 1.3 | 3.6 |
| (Octadecyl acetoacetato)aluminum diisopropoxide, prepared as in Example I | 0.01 | 0.0 | 0.1 |
| (Octadecyl benzoylacetato)$_{0.5}$ aluminum (Isopropoxide)$_{2.5}$, prepared as in Example V | 0.01 | 0.0 | 0.0 |
| (Octadecyl benzoylacetato)$_{2.5}$ aluminum (Isopropoxide)$_{0.5}$, prepared as in Example VI | 0.05 | 0.0 | 0.0 |

A paint was prepared by ball milling 303 g. of a 33% toluene solution of the (distearin acetoacetato)$_{1.5}$ aluminum (isopropoxide)$_{1.5}$ chelate, prepared as in Example VII, was 100 g. of TiO$_2$ pigment. One coat of the resulting white paint was brushed on a brick wall at an application weight of 49 g. of liquid paint per sq. ft. of wall surface. After seven months the painted wall is still attractive in appearance and is water-repellent.

The cracks in a concrete floor were filled with a composition made by milling together equal parts of titanium oxide and a 50% toluene solution of the above (distearin acetoacetato)$_{1.5}$ aluminum (isopropoxide)$_{1.5}$ chelate, with enough carbon black to give the mix a gray color. After six months there was still no evidence of leakage through the cracks.

A 3-inch square piece of brown dyed suede leather weighing 2.4 g. was immersed, for three minutes, in a 20% toluene solution of (octadecyl acetoacetato)aluminum diisopropoxide, prepared as in Example I. Excess liquid was removed by blotting and the impregnated leather allowed to air-dry overnight. The increase in dry weight was 27%. After tumbling with water in a jar containing glass marbles for 30 minutes, the additional increase in weight was 86%. An untreated control under the same conditions absorbed 146% of water.

Both the treated and the untreated samples were then separately subjected to the "dry-cleaning" action of perchloroethylene for 30 minutes. After this treatment the water up-take of the treated and untreated samples was essentially the same as before treatment with perchloroethylene. A second "dry-cleaning" did not appreciably change the water up-take of the leather.

A piece of cotton sheeting which had been washed with soap and water, rinsed, and dried was dipped into a 10% toluene solution of the (distearin acetoacetato)$_{1.5}$ aluminum (isopropoxide)$_{1.5}$ chelate of Example VII, blotted gently, and allowed to air-dry. The increase in weight was 8.2%. The treated fabric was unchanged in appearance and "feel," and was highly water-repellent.

The treated fabric was placed in a steam bath for 50 minutes, thereafter washed in a boiling 0.1% aqueous solution of ivory soap, rinsed well with water, and dried 15 minutes at 60° C. This washing treatment had no effect on the water-repellency of the fabric and this condition was substantially retained even after three similar treatments.

A piece of filter paper was dipped into a 10% solution of a (distearin acetoacetato)$_{1.5}$ aluminum (isopropoxide)$_{1.5}$ chelate, excess solution was allowed to drain off, and the treated paper permitted to air-dry. The increase in weight was 8%. The treated paper was not wetted by water.

The alkoxy aluminum chelates of this invention can be blended with conventional film-forming clear and pigmented coating compositions, e. g., drying oil alkyd resin compositions, etc., to form modified coating compositions which after baking or air drying give coatings on wood and steel which have improved water repellency.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. (Octadecyl acetoacetato)aluminum diisopropoxide, having the following structural formula

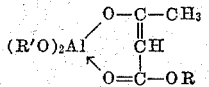

where R is an octadecyl group and R' is an isopropyl group.

2. An alkoxy aluminum chelate composition having the average empirical formula $(R)_xAl(OR')_y$ wherein R' is alkyl of 1 to 4 carbon atoms, R is the anion of a bidentate chelating agent having one acidic hydrogen and containing an alkyl straight chain of at least 12 carbons, said anion being linked to aluminum through oxygen and at most one nitrogen, $x$ and $y$ are each at least 0.5 and together total 3.

3. An alkoxy aluminum chelate composition having the average empirical formula $(R)_xAl(OR')_y$ wherein R' is alkyl of 1 to 4 carbon atoms, R is the anion of an acetoacetate of an alcohol having an alkyl straight chain of at least 12 carbons, said anion being linked to aluminum through oxygen, $x$ and $y$ are each at least 0.5 and together total 3.

4. An alkoxy aluminum chelate composition having the average empirical formula $(R)_xAl(OR')_y$ wherein R' is alkyl of 1 to 4 carbon atoms, R is the anion of an acylacetate of an alkanol having an alkyl straight chain of at least 12 carbons, said anion being linked to aluminum through oxygen, $x$ and $y$ are each at least 0.5 and together total 3.

5. An alkoxy aluminum chelate composition having the average empirical formula $(R)_xAl(OR')_y$ wherein R' is alkyl of 1 to 4 carbon atoms, R is the anion of a beta-ketoester containing an alkyl straight chain of at least 12 carbons, said anion being linked to aluminum through oxygen, $x$ and $y$ each are at least 0.5 and together total 3.

6. A porous object made water repellent by impregnation with a chelate according to claim 2.

7. A coating composition comprising a chelate according to claim 2 dispersed in an organic diluent.

8. The composition of claim 7 which additionally contains a pigment.

References Cited in the file of this patent

UNITED STATES PATENTS

| 1,878,112 | Cooper et al. | Sept. 20, 1932 |
| 2,307,075 | Quattlebaum | Jan. 5, 1943 |
| 2,556,316 | Cartledge | June 2, 1951 |
| 2,615,860 | Burgess | Oct. 28, 1952 |
| 2,670,303 | Mailander | Feb. 23, 1954 |

FOREIGN PATENTS

| 289,493 | Great Britain | Apr. 30, 1928 |
| 1,038,853 | France | Oct. 2, 1953 |
| 718,283 | Great Britain | Nov. 10, 1954 |

OTHER REFERENCES

Pages 789–790 of the publication "Nature," Nov. 5, 1949. Article dealing with the Mechanism of the Meerwein-Ponndorf. Reduction. 260–448.

Narcus Metal Finishing 50 (1952).

Martell et al., "Analytical Chem.," 26 (1954).